Figure 1:
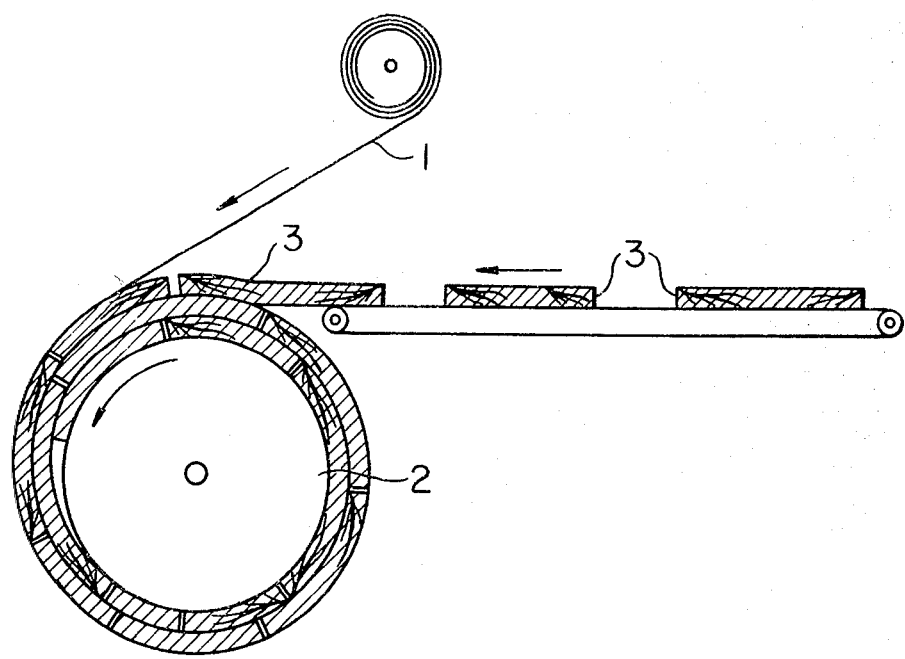

United States Patent [19]

Nakatsuka et al.

[11] 3,897,581

[45] July 29, 1975

[54] PLYWOOD VENEER OF EDGE-BONDED WET WOOD PIECES AND METHOD OF MAKING SAME

[75] Inventors: Ryuzo Nakatsuka, Yokohama; Mituo Furuta, Sagamihara; Setsuo Suzuki; Nobuyoshi Kawahara, both of Yokohama, all of Japan

[73] Assignee: Sumitomo Bakelite Company, Limited, Tokyo, Japan

[22] Filed: Dec. 11, 1973

[21] Appl. No.: 423,707

[30] Foreign Application Priority Data

| Mar. 27, 1973 | Japan | 48-34073 |
| Mar. 27, 1973 | Japan | 48-34074 |
| Mar. 27, 1973 | Japan | 48-34075 |
| Apr. 10, 1973 | Japan | 48-40042 |
| Sept. 10, 1973 | Japan | 48-101232 |

[52] U.S. Cl. ............... 428/44; 156/79; 156/94; 156/250; 156/304; 156/331; 260/2.5; 260/29.2; 260/77.5; 428/423
[51] Int. Cl.² ... B32B 3/10; B32B 27/40; B32B 31/18; C08G 18/02
[58] Field of Search ........ 161/36, 190; 260/29.2 TN, 260/77.5 A, 2.5 R; 156/94, 331, 79, 250, 304

[56] References Cited
UNITED STATES PATENTS

| 3,076,738 | 2/1963 | Uschmann | 156/331 |
| 3,380,950 | 4/1968 | Blomeyer | 260/77.5 A |
| 3,461,103 | 8/1969 | Keberle et al. | 260/29.2 TN |
| 3,535,274 | 10/1970 | Dieterich et al. | 260/29.2 TN |
| 3,741,853 | 6/1973 | Forsythe et al. | 156/94 X |

*Primary Examiner*—Philip Dier
*Attorney, Agent, or Firm*—Karl W. Flocks

[57] ABSTRACT

A method for bonding wet woods with specific polyurethane type liquid adhesives capable of bonding wet flitches or logs, filling and bonding cracks of wet logs, or splicing wet veneers. The wet woods bonded according to the above-mentioned method may be cut to give slices and veneers. The method, which is quite useful from the industrial standpoint, has been accomplished by the utilization of characteristics of specific liquid polyisocyanate prepolymers.

36 Claims, 2 Drawing Figures

PLYWOOD VENEER OF EDGE-BONDED WET WOOD PIECES AND METHOD OF MAKING SAME

This invention relates to a method for bonding wet woods with polyurethane type liquid adhesive compositions, and to its application.

According to the method of the present invention, wet woods can be bonded by the use of specific polyurethane type liquid adhesive compositions. This fact has markedly enlarged new applications of adhesives for woods in various fields such as civil engineering, building, wood processing and plywood manufacture.

Polyurethane type adhesives have such drawbacks that they are relatively high in cost, susceptible to humidity and easily foamed, but have many such characteristics that they can form flexible and tough glue lines and are fast curable at room temperature. Due to these characteristics, the uses of said adhesives are being gradually developed in the fields where such characteristics are required.

In the field of wood industry, however, such high cost adhesives have scarcely been used yet, and only such low cost adhesives as usual water soluble type thermosetting resins, e.g. phenol-, resorcin-, urea-, and melamine-type resins, or usual emulsion type thermoplastic resins, e.g. vinyl acetate-, ethylene-vinyl acetate- and acryl-type resins, have chiefly been used. However, the usual wood adhesives have had favorable adhesion only to sufficiently dried woods. Even when wet woods appear to have been well bonded with the usual adhesives, they are easily peeled off when subjected to hot water treatment in practice. That is, since no adhesives having favorable adhesion to wet woods have been obtained hitherto, the bonding of wet woods has been considered impossible.

Generally, the bonding of wet woods has strongly been desired heretofore in many fields such as civil engineering, building, wood processing and plywood manufacture. Due to the recent world-wide shortage of wood resources, however, good quality woods free from defects have come to be difficult to obtain in large quantities and at low costs. Accordingly, in the production of plywood and decorative plywood, for example, mending of inferior woods and regeneration of waste woods, with an aim to effectively utilize the scant wood resources to the maximum, have become extremely serious problems. In this case, the starting woods are sliced or subjected to rotary lathes to give thin veneers, so that the water content of the woods is maintained, during said steps, at more than 25 % by weight (dry base (the water content when dried wood is 100)) so as to facilitate the cutting of the woods. For the mending and regeneration of the starting woods, therefore, a method of making the bonding of wet woods possible is required.

Paying attention to the fact that some of the polyurethane type adhesives are not only hydrophilic and easily applicable to wet wood surfaces but can also cure at room temperature when further incorporated with a small amount of water, the present inventors have made extensive studies to succeed in obtaining adhesives for wet woods, and have made the bonding of wet woods possible by use of said adhesives. It is one of the great advantages of this kind of adhesive that it can be used as one-component type adhesive.

Heretofore, the susceptibility of polyurethane type adhesives to water has rather been considered as a drawback of said adhesives. The present invention intends to conversely utilize said property to develop specific uses of the adhesives.

Among epoxy type adhesives curable at room temperature, there have been known those which are adherable to wet surfaces of concrete. Generally, however, this kind of adhesive shows insufficient adhesion to wet woods. Further, some of the epoxy type adhesives are adherent to wet woods. However, such epoxy type adhesives give cured resin articles that are more unsatisfactory in flexibility and heat resistance than in the case where polyurethane type adhesives are used. Accordingly, polyurethane type adhesives are more excellent in adhesion to wet woods than epoxy type adhesives.

An object of the present invention is to provide a method for bonding wet woods having a water content of more than 25 % by weight (dry base) with a liquid adhesive composition consisting of a hydrophilic, polyfunctional, liquid polyisocyanate prepolymer which contains substantially no active hydrogen group, has terminals composed mainly of NCO groups, has an NCO group content of 2 to 15 %, has a number average molecular weight of 1,000 to 20,000, and is curable at room temperature by the action of water contained in the wet woods.

Another object of the invention is to provide a novel method for bonding wet woods with a liquid adhesive composition consisting of the above-mentioned hydrophilic, polyfunctional, liquid polyisocyanate prepolymer, which composition has been improved in curability, workability, appearance and bonding strength by incorporating into the said prepolymer suitable amounts of water and/or a hardener and, if necessary, suitable amounts of a filler, a colorant, a solvent and a surfactant.

A further object of the invention is to provide veneers for plywood and decorative sliced veneers obtained from wet woods which have been bonded according to any of the above-mentioned methods.

In the production of veneers, the method of the present invention is applied to such steps as mentioned below.

A. In the production of veneers for plywood:
1. The step of filling and bonding cracks of wet logs.
2. The step of bonding wet short logs.
3. The step of splicing wet narrow veneers byproduced when the wet logs are cut with a rotary lathe.

B. In the production of decorative sliced veneers:
4. The step of assembling and bonding wet flitches.

In the above manner, an increase in yield, an effective utilization of waste and inferior woods and labor saving are made possible according to the present invention. In order to practice the above-mentioned processes, however, the adhesives used should have the following characteristics:

i. They should be fast curable at room temperature.
ii. They should have favorable adhesion to wet woods.
iii. They should be resistant to hot water treatment (causing no degradation of bonding strength nor swelling of glue lines).
iv. They should have a strong bonding strength.
v. They should form glue lines having a proper flexibility.

vi. They should form heat resistant glue lines (which do not become brittle nor sticky even when subjected to heating).

vii. They should be low viscosity liquids.

viii. They should be light colored and resistant to discoloration.

ix. They should not stain woods.

x. They are one-component type adhesives, if necessary.

The polyurethane type liquid adhesive compositions used in the present invention can sufficiently satisfy all the above-mentioned characteristics. Accordingly, the polyisocyanate prepolymers, which constitute the polyurethane adhesive compositions used in the present invention, must have such a structure as mentioned below.

i. The polyisocyanate prepolymers should contain substantially no active hydrogen groups. Otherwise a condensation reaction proceeds during storage of the prepolymers, and thus the prepolymers are greatly varied in viscosity or curability or gel undesirably, and thus their shelf life is extremely shortened. The term "active hydrogen groups" used herein signifies alcoholic OH groups (primary or secondary), amino groups (primary or secondary), and other groups similar in rectivity to said groups. It is therefore undesirable that the prepolymers contain as impurities compounds having active hydrogen groups such as water, polyols and polyamines.

ii. The polyisocyanate prepolymer should contain 2 to 15 % by weight of NCO groups.

The content of NCO groups smaller than said amount is undesirable, because it follows that a small amount of NCO group in the prepolymer lowers curing rate at room temperature. The content of NCO groups larger than said amount is also undesirable, because it follows that a large amount of NCO group reacts with water to cause marked foaming, so that the resulting glue lines are weakened. That is, in the present invention, a part of the NCO groups reacts with water, and the other part of the NCO groups further reacts to contribute to the crosslinking of the prepolymers, so that an NCO group content within the aforesaid range gives a cured resin ariticle having most favorable physical properties.

iii. The polyisocyanate prepolymers should have a number average molecular weight of 1,000 to 20,000. If the molecular weight is lower than said value, the resulting glue lines become brittle. If the molecular weight is higher than said value, the prepolymers become high in viscosity, and thus are markedly reduced in adhesion to wet woods, and are greatly deteriorated in bonding strength when subjected to hot water treatment.

The method of the present invention has such a feature that wet woods having a water content of more than 25 % by weight (dry base) can be bonded to each other. The above-mentioned polyisocyanate prepolymer can quickly cure at room temperature owing to the action of water in such wet woods. In this case, NCO groups of the resin react with the water to generate carbon dioxide, and the resulting glue line comes to contain a small amount of fine bubbles, but this is not so objectionable from the practical standpoint.

In the present invention, it follows that woods can be bonded even if the water content thereof is smaller than 25 % by weight. According to the present method, it is rather easy to bond dry woods, but the significance of the present invention resides in that wet woods, which cannot be bonded with ordinary adhesives, can be bonded according to the method of the present invention.

The relation between molecular weight and NCO group content of the liquid polyisocyanate prepolymer used in the present invention is as follows:

If the molecular weight of the prepolymer is somewhat low, the NCO group content thereof is desirably made somewhat high. Conversely, if the molecular weight of the prepolymer is somewhat high, the NCO group content thereof is desirably made somewhat low. A prepolymer having a low molecular weight and a low NCO group content is low in curability and inferior in adhesion. Alternatively, a prepolymer having a high molecular weight and a high NCO group content is so high in reactivity as to easily gel at the time of preparation or during storage. So far as the storability permits, however, it is desirable that the prepolymer is high in both NCO group content and molecular weight.

A prepolymer having such a construction as above is desirable in that when it is applied to wet woods, not only the water in the woods easily diffuses to the interior of glue line, but also the resin diffuses easily to the wood surfaces. Further, the said prepolymer has 2 or more NCO groups per molecule and hence is polyfunctional, and quickly cures to form a three dimensional structure having a proper network density. Moreover, the prepolymer is liquid and hence is easily applicable. A solid or highly viscous liquid prepolymer is not desirable in workability.

In order to provide a proper hydrophilic property or curability, the polyisocyanate prepolymer used in the present invention is selected, according to its application, from such prepolymers as mentioned below.

i. Water-soluble, liquid polyisocyanate prepolymer having the main chain composed of a polyalkylene-ether-urethane chain:

This prepolymer shows a maximum adhesion to wet woods, but forms a glue line which is somewhat easily swollen by hot water treatment. Accordingly, the prepolymer is most suitable for use in the production of veneers for plywood or decorative sliced veneers that are extremely thin in glue line. Further, the prepolymer is suitable also for use in the case where it is incorporated with a large amount of water and is cured to the form of a hydrous gel or foam.

ii. Hydrophilic, liquid polyisocyanate prepolymer having the main chain composed of a polyalkylene-ether-urethane chain and a polyester-urethane chain:

In the case of this prepolymer, the adhesion thereof to wet woods and the resistance of the resulting glue line to swelling due to hot water are both good. Accordingly, the prepolymer is suitable for use in the production of veneers for water-resistant plywood which are so thick in glue line that the resistance to the swelling of glue line due to hot water come to be required.

iii. Hydrophilic liquid polyisocyanate prepolymer having aliphatic isocyanate groups:

Generally, the prepolymer gives a cured article that is difficult to discolor even when subjected to irradiation of light. Further, aliphatic isocyanate groups are somewhat low in reactivity with water, so that the pot life or open time of the prepolymer can be made relatively long to enhance the workability. Accordingly, the prepolymer is suitable for use in the production of decorative sliced veneers.

Alternatively, the polyfunctional polyisocyanate prepolymer used in the present invention may be a blend of various prepolymers which has been so prepared as to meet the above-mentioned conditions. In this case, the individual prepolymers are not always required to satisfy the said conditions.

The liquid polyisocyanate prepolymer used in the present invention may be prepared according to any process so far as it has such a construction as mentioned above. An example of such a process is set forth below.

Bifunctional or more functional polyalkylene-ether type and/or polyester type polyols having a number average molecular weight of 200 to 10,000 are mixed with one or more of bifunctional or more functional aliphatic and/or aromatic polyisocyanate compounds in such proportions that the molar ratio of NCO groups to OH groups is in the range from 1.1 to 2.5. The resulting mixture is reacted in a substantially anhydrous system in the presence of an organotin type catalyst such as dibutyltin dilaurate and/or a tertiary amine type catalyst such as triethylene diamine, until substiantially all of the alcoholic OH groups disappear, and thus a prepolymer usable in the present invention can be obtained.

In the above case, a solvent containing substantially no water and having no active hydrogen group may be added either before or after the reaction. The addition of said solvent results in such advantages that (i) the viscosity of the adhesive is lowered and (ii) at the time of curing, bubbles escape easily from the glue line.

The anhydrous solvent used in the present invention is preferably a hydrophilic solvent such as a ketone, an ester or an ether, and may be used in combination with a small amount of a hydrocarbon. However, the bonding strength of the adhesive is lowered in proportion to the amount of solvent added, so that the solvent is desirably used in an amount as small as possible.

The term "long polyalkylene-ether-urethane chain" used herein signifies a long chain structure having a urethane linkage represented by the formula —O—CO—NH— in combination with an ether linkage represented by the formula —R—O—R'—, wherein R and R' are individually a $C_2$–$C_6$ aliphatic type alkylene linkage, preferably

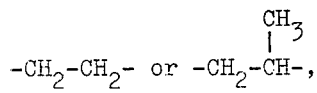

and R and R' may partly contain an alicyclic, aromatic or heterocyclic type linkage, and may contain linkages other than the above ether and urethane linkages, e.g. acid amide, urea, arophanate and the like. These linkages can be formed, for example, by the polyaddition reaction of usual polyisocyanate compounds such as hexamethylene diisocyanate (HDI), tolylene diisocyanate (TDI), diphenylmethane diisocyanate (MDI), xylylene diisocyanate (XDI), etc. with the so-called polyalkylene-ether type polyols obtained by adding alkylene oxides to polyfunctional compounds containing active hydrogen groups, e.g. polyols, polyphenols, polyacids, polyamides, etc.

The term "long polyester-urethane chain" used herein signifies a long chain structure having a urethane linkage represented by the formula —O—CO—NH— in combination with an ester linkage represented by the formula —R″—O—CO—R‴, wherein R″ and R‴, which may be same or different, are individually a $C_2$–$C_6$ aliphatic type alkylene linkage, and R″ and R‴ may partly contain an alicyclic, aromatic, or heterocyclic type linkages, and may contain linkages other than the above ester and urethane linkages, e.g. acid amide, urea, arophanate, amino or ether linkages. These linkages can be formed, for example, by the polyaddition reaction of conventional polyisocyanate compounds such as TDI, MDI, HDI, XDI, etc., with long chain polyester type polyols obtained by the condensation reaction of an excess of polyols (chiefly bifunctional polyols) with aliphatic type polyacids (chiefly bifunctional polyacids). Further, castor oil may also effectively be used as the polyester polyol.

A long chain structure containing all of ether, ester and urethane linkages, also can effectively be used in the present invention. Such a structure can be formed, for example, by the polyaddition reaction of usual polyisocyanates such as TDI, MDI, HDI, XDI, etc. with polyether-ester type polyols obtained by the reaction of an excess of polyester type polyols with aliphatic type polyacids.

The term "aliphatic type isocyanate groups" used herein signifies isocyanate groups bonded directly to aliphatic groups, and the prepolymer with them can be formed, for example, by the reaction of polyols with aliphatic type polyisocyanate compounds such as hexamethylene diisocyanate (HDI), xylylene diisocyanate (XDI), hydrogenated diphenylmethane diisocyanate (hydrogenated MDI), hydrogenated tolylene diisocyanate (hydrogenated TDI), dimelyl diisocyanate (DDI), etc. or adducts thereof under the conditions that an excess of NCO group is present.

The aliphatic type isocyanate groups are somewhat lower in reactivity to aromatic type isocyanate groups, but have such a merit that they are difficult to discolor on irradiation with light. If the pot life or open time of adhesives containing aromatic type isocyanate groups is so short that they are difficult to use, then the said groups may be replaced by aliphatic type isocyanate groups to control the pot life or open time of adhesives.

The liquid adhesive composition used in the present invention cures at room temperature by reaction with water contained in wet woods. In the case of this composition, the rate of diffusion of water into the glue line and the rate of curing of the resin are well balanced with each other, so that the adhesive composition gives a unique and excellent effect for the bonding of wet woods.

The liquid polyisocyanate prepolymer used in the present invention is stable until it is coated on wet woods, and has an extremely long pot life such as more than 24 hours. Moreover, the prepolymer, when coated on wet wood surfaces, cures in a period of 2 to 20 hours at room temperature. Accordingly, the present adhesive composition composed mainly of the liquid polyisocyanate prepolymer is a one-component type, room temperature-curable adhesive having excellent workability for the bonding of wet woods.

Before application, the adhesive composition may be incorporated with a proper amount of water as crosslinking adjuvant. The incorporation of water into the liquid adhesive composition gives the following advantages:

i. Even at thick glue line portions ascribable to unevent surfaces of wet woods, the adhesive composition can be cured accurately and uniformly since the water has sufficiently been dispersed even in the interior of the glue line.

ii. Due to incorporation of water, the flow of the adhesive composition can be controlled without substantially deteriorating the adhesive properties thereof. It is therefore possible to greatly enhance the workability of the adhesive composition in the case where large amounts of fillers such as wood flour, calcium carbonate, clay, wheat flour and soybean meal are desired to be incorporated into the adhesive composition, or the composition is intended to be injected into narrow gaps or coated on a broad area. In this case, a hydrophilic solvent such as a ketone may be used, but water is preferable in that it is low in cost, free from such a danger as inflammability, toxicity, etc., and has not any effect on the adhesive properties of the composition. The incorporation of water gives a foamed glue line less in swelling due to hot water treatment.

In the method of the present invention, water is desirably added in at least the stoichiometric equivalent to the NCO groups of the polyisocyanate prepolymer. In this case, a slight difference in amount of water added does not substantially affect the adhesive properties of the composition. However, if the amount of water added is excessively large, the hardened glue line is undesirably softened or weakened. Ordinarily, the amount of water to be added is preferably less than 500 phr. The adhesive composition should so sufficiently be stirred that water may be uniformly incorporated. Water may be incorporated together with a water-soluble inert solvent, e.g. a ketone or an ether, and an active curing agent. It is preferable that water is efficiently incorporated into the adhesive composition by use of a two-liquid automatic continuous mixing machine in the method of this invention.

In the method of this invention, an anhydrous solvent is desirably added in order to lower the viscosity of the adhesive composition. In this case, the solvent is preferably hydrophilic so that the composition can be intimately adhered to wet woods. The adhesive composition may further be incorporated with a usual hardener in order to promote the curing rate thereof. The incorporation of hardener is particularly effective when the composition is used at room temperature below 15°C. The hardener is classified into a latent hardener, which is previously incorporated into the composition, and a rapidly acting hardener, which is incorporated immediately before use of the composition.

The rapidly acting hardener used in the present invention is a conventional hardener for polyurethane resins. Examples of such hardeners include polyols such as glycerin, trimethylol propane, pentaerythritol, triethanolamine, sorbitol, sugar and condensates thereof with alkylene oxides, amines such as ethylenediamine, diethylenetriamine, triethylenetetramine, polyethyleneimine, menthanediamine, monoethanolamine, monobutylamine, phenylenediamine, dichlorodiamino-diphenylmethane and triethylenediamine, polyamides, monovalent and polyvalent carboxylic acids, metal salts of said acids, organic amine salts thereof, and organometallic salts such as dibutyltin dilaurate. In the present invention, a hydrophilic polyfunctional compund having active hydrogen groups is preferable. The hardener may be used in the form of an aqueous solution.

The latent hardener used in the present invention is a compound which, like ketoimine, reacts with water to form active hydrogen groups. This hardener is obtained by the condensation of a ketone, e.g. acetone or methyl ethyl ketone, with at least one primary polyamino compound selected from the group consisting of aliphatic polyamines such as ethylenediamine, trimethylenediamine, tetramethylenediamine, hexamethylenediamine, xylylenediamine and menthanediamine, aromatic polyamines such as phenylenediamine, diaminodiphenylmethane, aniline resin and dichlorodiaminodiphenylmethane, and hydrogenation products of said polyamines.

In the present invention, the adhesive composition is further incorporated desirably with a filler in order to enhance the composition in such a workability as increase in viscosity, impartment of thixotropy, prevention of penetration, increase in provisional adhesion at prepress, etc. The filler used in the present invention is an organic powder such as wood flour, bark flour, grain flour, rice hull powder, pulp powder or linter powder, an inorganic powder such as calcium carbonate, clay, talc, bentonite, silica powder, gypsum powder, colloidal silica, asbestos powder, mica powder or glass fiber powder, or an organic or inorganic fiber of 1 to 50 mm. in length. Among the above-mentioned fillers, the organic powder that is hydrophilic and low in hardness is particularly preferable. Particularly in bonding short pieces of wood, it is desirable that the adhesive composition is incorporated with wood flour to impart thixotropic property thereto.

The adhesive composition used in the present invention is additionally incorporated desirably with a colorant. Particularly when the glue line gives influence to the appearance of the product, like in the case of decorative sliced veneer, it is necessary to use a colorant. Further, the incorporation of colorant is effective for preventing the glue line from discoloration due to light. As the colorant, any of ordinary pigments and dyes for polyurethane resins is usable.

The adhesive composition is further incorporated desirably with a foam-controlling agent in order to finely and uniformly disperse the bubbles contained in the glue line. The foam-controlling agent not only stabilizes the bonding strength of the composition but also improves the appearance of the bonded article. The foam-controlling agent may be any of those which are ordinarily used for polyurethane resins, but is preferably a silicon type foam-controlling agent.

The wet woods referred to in the present invention are required to have a water content (dry base) of more than 25 % to be cut with a rotary lathe or a slicer in the wet state. They may have a water content of several hundred %. If the surfaces of woods to be bonded with the adhesive composition of one-component type are excessively dry, the woods may be treated after properly wetting the surfaces with water. It is, of course, not desirable that the surfaces of woods are covered with water layers. In such case, the woods may be bonded after lightly wiping the water with paper or cloth, or vertically erecting the surface of woods to drain, or slightly drying the woods with air. In any way, the adhesive composition used in the present invention can be applied to the surfaces of woods which are so high in water content to be coated with the conventional urethane type coatings. If the surfaces of woods have been putrefied or stained with oils or fats, the woods cannot be bonded sometimes with the adhesive composition, so that the wood surfaces are desirably cleaned by shaving or the like treatment.

The present method for bonding wet woods has unique excellent advantages not only from the side of properties of bonded article but also from the side of workability of adhesion operation which cannot be seen in the conventional methods, and thus it is extremely broad in its industrial application. For example, there are many fields in which there can be utilized simplification of actual operations in civil engineering and building; rationalization of production of various plywood, boards, decorative plywoods and decorative boards; improvement in efficiency of wood-working operation, and the like advantages derived from the fact that according to the present method, wet woods can be bonded without drying.

Generally, in the production of plywood, a wet log is taken out of water, and then is sawed to a desired length and cut by means of a rotary lathe to wet veneers of 0.5 to 7 mm. in thickness, which are then dried, coated with an amino type (or phenol type) adhesive composition, laminated, and bonded by hot-pressing to obtain plywood.

As compared with the above-mentioned method, the present method has such advantages as mentioned below.

i. If, in general method, the starting log without cracks is cut with a rotary lathe to obtain continuous veneers, then the subsequent steps may be able to proceed automatically. According to the present method, cracks of starting log are filled and bonded with a resin layer and/or a foamed resin layer, and then even the log having cracks can be cut with a rotary lathe to obtain continuous veneers, and thus inferior logs having cracks can also be utilized effectively.

ii. In the old method, short pieces of wood are by-produced when the starting log is sawed to a desired length, and no veneers can be produced from said pieces of wood, and thus the products are necessarily lowered in yield. According to the present method, even short pieces of starting log can be bonded to a desired length, and thus waste woods can also be utilized effectively.

iii. In the old method, considerably large quantities of discontinuous narrow veneers are by-produced at the initial stage when the starting log is cut with a rotary lathe, since the log is not in the form of a perfect column. These veneers are so wet that they cannot be spliced before drying, and thus require many hands both in splicing and drying process. According to the present method, the by-produced narrow veneers in a wet state can be spliced to a continuous form or to a desired length, and the subsequent steps are conducted automatically, so that even waste woods can be utilized effectively.

Further, in the production of decorative plywood, square flitches are cut in a wet state from birch wood, elm wood, santal wood, black wood, rose wood, paulownia wood, bamboo, teak wood, or the like high quality wood beautiful in grain, softened, if necessary, by hot water treatment, and sliced to a thickness of 0.2 to 1 mm. to prepare decorative sliced veneers, which are then pasted on ordinary plywood by use of an adhesive of the urea and/or vinyl acetate type to obtain decorative plywood. If the starting wood used in the general method is small in diameter, then, both of the flitches obtained therefrom and the decorative sliced veneers become narrow in width, and many hands are required in pasting the veneers on plywood. According to the present method, even narrow flitches in a wet state can be bonded to prepare a broad square block, which is then sliced, after hot water treatment if necessary, to obtain broad decorative sliced veneers at low cost and with high efficiency, and thus inferior woods can be utilized effectively. Further, the narrow flitches may be assembled and bonded so as to form a desired pattern and then sliced, whereby decorative sliced veneers having the desired pattern can be obtained at low cost and with high efficiency.

All such new applications as mentioned above are based on the novel method of the present invention which has made the bonding of wet woods possible.

Figure 2:
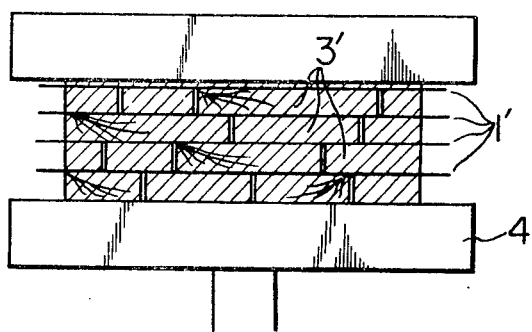

In the accompanying drawings,

FIG. 1 shows an embodiment of the present method in which a continuous veneer is obtained by continuously splicing narrow wet veneers, and FIG. 2 shows an embodiment of the present method in which a continuous veneer is obtained by splicing narrow wet veneers between pressurizing plates.

The present invention is illustrated in more detail below with reference to examples, but the examples are for illustration and not for limitation. In the following examples, "M.W." means number average molecular weight.

EXAMPLE 1

A mixture comprising 1 mole of polyethylene glycol (M.W. 3,000), 1 mole of triol polyester (M.W. 300) and 4 moles of crude MDI was polycondensed with stirring at 70° to 80°C., until the OH groups were substantially consumed, to prepare a liquid polyisocyanate prepolymer having an NCO group content of 5.9 % by weight and a number average molecular weight of 5,400. This prepolymer was easily soluble in water at optional proportions, and cured at room temperature while reacting with water.

The thus prepared prepolymer was coated on the surfaces of two wood pieces having a water content of 80 %. The wood pieces were laid up and then allowed to stand at room temperature for 12 hours, whereby the two wood pieces were completely bonded. The rotary veneers, sliced veneers or lumbers could be obtained in the bonded state by cutting the bonded wood with a rotary lathe, a slicer or a disc saw, and even after drying the products at 160°C for 50 minutes.

EXAMPLE 2

A mixture comprising 1 mole of polypropylene glycol (M.W. 410), 1 mole of triol polyether (M.W. 300) and 4 moles of TDI was reacted with stirring at 60° to 90°C., until the OH groups were substantially consumed, to prepare a liquid polyisocyanate prepolymer having an NCO group content of 4.6 % by weight and a number average molecular weight of 5,000. This prepolymer was homogeneously miscible with water at optional proportions, and cured at room temperature while foaming by reaction with water.

The thus prepared prepolymer was coated on the surfaces of two wood pieces having a water content of 60 %. The wood pieces were laid up and then allowed to stand at room temperature for 12 hours, whereby the two wood pieces were completely bonded. The rotary veneers, sliced veneers and lumbers could be obtained in the bonded state by cutting the bonded wood with a rotary lathe, a slicer and a disc saw, and even after drying the products at 170°C. for 60 minutes.

EXAMPLE 3

A mixture comprising 3 moles of polypropylene glycol (M.W. 410), 1 mole of hexaol polyester (M.W. 1,200) and 10 moles of tolylene diisocyanate was polycondensed at 60° to 100°C., until the OH groups were substantially consumed, to obtain a liquid and hydrophilic polyisocyanate prepolymer having an NCO group content of 7.5 % by weight and a number average molecular weight of 2,600. This prepolymer cured at room temperature while foaming by reaction with water.

The thus prepared prepolymer was coated on the surfaces of two wood pieces having a water content of 100 %. The wood pieces were laid up and then allowed to stand at room temperature for 12 hours, whereby the two wood pieces were completely bonded. The glue lines of veneers obtained by slicing the bonded wood to a thickness of 0.3 mm. were tough and high in flexibility.

EXAMPLE 4

A mixture comprising 1 mole of polyethylene glycol (M.W. 3,000), 1 mole of triol polyether (trimethylol propane-ethylene oxide adduct; M.W. 300), 2 moles of caster oil and 5 moles of TDI was polycondensed with stirring at 60° to 100°C., until the OH groups were substantially consumed, to prepare a liquid polyisocyanate prepolymer having an NCO group content of 3.6 % by weight and a number average molecular weight of 10,300. This prepolymer was homogeneously miscible with a small amount of water, and cured at room temperature while foaming by reaction with water.

The thus prepared prepolymer was coated on the surfaces of two wood pieces having a water content of 70 %. The wood pieces were laid up and then allowed to stand at room temperature for 12 hours, whereby the two wood pieces were completely bonded. The resulting bonded wood were still in the bonded state when the wood was cut with a rotary lathe, a slicer or a disc saw, and even when the wood was dipped in hot water at 80°C. for 4 hours.

EXAMPLE 5

A mixture comprising 4 moles of polyethylene glycol (M.W. 410) and 6 moles of HDI was reacted with stirring at 80° to 100°C., until the OH groups were substantially consumed, to prepare a liquid polyisocyanate prepolymer having an NCO group content of 2.2 % by weight and a number average molecular weight of 20,000. This prepolymer was soluble in water, and cured at room temperature while foaming by reaction with water.

The thus prepared prepolymer was coated on the surfaces of two wood pieces having a water content of 80 % by weight. The wood pieces were laid up and then allowed to stand under pressure at room temperature for 12 hours, whereby the two wood pieces were completely bonded. The bonded wood was cut with the rotary lathe, a slicer or a disc saw to give bonded rotary veneers, sliced veneers or lumbers without any change in glue line. The adhesive strength of products did not degrade even after drying at 160°C. for 45 minutes.

EXAMPLE 6

A liquid adhesive composition prepared by mixing 100 g. of the prepolymer obtained in Example 2 with 100 g. of water was immediately coated on the surfaces of two wood pieces having a water content of 30 %. The wood pieces were allowed to stand under pressure for 12 hours, whereby the two wood pieces were completely bonded. The bonded wood showed no change at all even when the wood was cut with a rotary lathe, a slicer or a disc saw.

EXAMPLE 7

A liquid adhesive composition prepared by mixing 100 g. of the prepolymer obtained in Example 2 with 400 g. of water immediately injected into cracks of a starting wood for plywood. Subsequently, the wood was allowed to stand for 12 hours, and then cut according to an ordinary procedure by use of a rotary lathe to obtain bonded veneers having cracks, which had completely been filled and bonded with a foamed urethane resin.

EXAMPLE 8

A liquid adhesive composition prepared by mixing 100 g. of the prepolymer obtained in Example 3 with 5 g. of water was coated on the surfaces of two wood pieces having a water content of 50 %. The wood pieces were laid up and then allowed to stand under pressure for 12 hours, whereby the two wood pieces were completely bonded. The bonded wood were still in the well bonded state when the wood was cut with a rotary lathe, a slicer or a disc saw.

EXAMPLE 9

A liquid adhesive composition prepared by mixing 100 g. of the prepolymer obtained in Example 4 with 7 g. of water was coated on the surfaces of two wood pieces having a water content of 50 %. The wood pieces were laid up and then allowed to stand under pressure for 12 hours, whereby the two wood pieces were completely bonded. The bonded wood were still in the well bonded state when the wood was cut with a rotary lathe, a slicer or a disc saw.

EXAMPLE 10

A liquid adhesive composition prepared by mixing 100 g. of the prepolymer obtained in Example 5 with 5 g. of water was coated on the surfaces of two wood pieces having a water content of 40 %. The wood pieces were laid up and then allowed to stand for 12 hours, whereby the two wood pieces were completely bonded. The bonded wood were still in the well bonded state when cut with a rotary lathe, a slicer or a disc saw. Further, the bonded wood was irradiated for 200 hours with ultraviolet rays by use of a weather-ometer, but the discoloration of the glue line did not differ from that of the wood.

EXAMPLE 11

A liquid adhesive composition prepared by mixing 100 g. of the prepolymer obtained in Example 1 with 30 g. of a polyamide resin having an amine value of about 230 was coated on the surfaces of two wood pieces having a water content of 45 %. The wood pieces were laid up and then allowed to stand at 3° to 5°C. for 12 hours, wereby the two wood pieces were completely bonded. The bonded wood were still in the well bonded state when cut with a rotary lathe, a slicer or a disc saw.

EXAMPLE 12

A liquid adhesive composition prepared by mixing 100 g. of the prepolymer obtained in Example 3 with 40 g. of a polyamide resin having an amine value of about 400 was coated on the surfaces of two wood pieces having a water content of 65 %. The wood pieces were laid up and then allowed to stand at 5°C. for 12 hours, whereby the two wood pieces were completely bonded. The bonded wood were still in the well bonded state when cut with a rotary lathe, a slicer or a disc saw.

EXAMPLE 13

A liquid adhesive composition prepared by mixing 100 g. of the prepolymer obtained in Example 1 with 30 g. of a polyamide resin having an amine value of about 230 was coated on the surfaces of two wood pieces having a water content of 35 %. The wood pieces were laid up and then allowed to stand at 5°C. for 12 hours, whereby the two wood pieces were completely bonded. The bonded wood could be cut with a rotary lathe, a slicer or a disc saw to prepare a bonded veneer, slice or lumber.

EXAMPLE 14

A liquid adhesive composition prepared by mixing 100 g. of the prepolymer obtained in Example 3 with 2 % of triethanolamine was coated on the surfaces of two wood pieces having a water content of 50 %. The wood pieces were laid up and then allowed to stand for 12 hours, whereby the two wood pieces were completely bonded. The bonded wood could be cut with a rotary lathe, a slicer or a disc saw to prepare a bonded veneer, slice or lumber.

EXAMPLE 15

A liquid adhesive composition prepared by mixing 100 g. of the prepolymer obtained in Example 4 with 10 g. of a polyacrylic acid solution in terms of solid content was coated on the surfaces of two wood pieces having a water content of 50 %. The wood pieces were laid up and then allowed to stand for 12 hours, whereby the two wood pieces were completely bonded. The bonded wood could be cut with a rotary lathe, a slicer or a disc saw to prepare a bonded veneer, slice or lumber.

EXAMPLE 16

A liquid adhesive composition prepared by mixing 100 g. of the prepolymer obtained in Example 1 with 7 g. of ketoimine obtained by the condensation of ethylenediamine with acetone was coated on the surfaces of two wood pieces having a water content of 60 %. The wood pieces were laid up and then allowed to stand at about 7°C. for 12 hours, whereby the two wood pieces were completely bonded. The bonded wood could be cut with a rotary lathe, a slicer or a disc saw to prepare a bonded veneer, slice or lumber.

EXAMPLE 17

A liquid adhesive composition was prepared by mixing 100 g. of the prepolymer obtained in Example 1 with 20 g. of anhydrous MEK (methyl ethyl ketone). This composition was so low in viscosity as to be easily coatable on wet wood surfaces by spraying, spreading, dipping or brushing. The adhesive property of the said composition was substantially identical with or somewhat inferior to that of the prepolymer.

A liquid adhesive composition prepared by mixing each of the prepolymers obtained in Examples 2, 3, 4 and 5 with MEK showed the same coatability and adhesive property as those of the above-mentioned composition.

EXAMPLE 18

One hundred Grams of a liquid adhesive composition prepared by incorporating 15 % of MEK into the prepolymer obtained in Example 1 was mixed, immediately before use, with 300 g. of water. The composition was injected into cracks of starting wood for plywood. At the initial stage of injection, the composition foamed, but, within 10 to 20 minutes after the injection, the foaming terminated and the composition gelled. After the injection, the wood was allowed to stand for about 12 hours. Subsequently, the wood was cut with a rotary lathe to obtain a continuous veneer having cracks filled with a foamed urethane resin. The glue line of this continuous veneer did not peel, crack or become sticky even when the veneer was subjected to clipping, drying and glue-spreading steps.

A liquid adhesive composition prepared by mixing each of the prepolymers obtained in Examples 2 and 3 with MEK and water was also used to bond the above-mentioned wood pieces to obtain substantially the same results as above.

EXAMPLE 19

A liquid adhesive composition prepared by mixing 100 g. of the prepolymer obtained in Example 1 with 20 g. of wood flour was coated on the surfaces of two wood pieces having a water content of 65 %. The wood pieces were laid up and then pressed for 12 hours, whereby the two wood pieces were completely bonded. The bonded wood could sufficiently withstand cutting with a rotary lathe, a slicer or a disc saw. The adhesive composition, which contained the wood flour, was less in dangling and outflow then the prepolymer only, and formed a tougher glue line. The same effects as above could be obtained also in the case where the wood flour was replaced by organic fiber, wood chip or silica gel powder.

A liquid adhesive composition prepared by mixing each of the prepolymers obtained in Examples 2, 3, 4 and 5 with the aforesaid wood flour was also used to bond the above-mentioned wood pieces to obtain the same results as above.

EXAMPLE 20

A liquid adhesive composition prepared by mixing 100 g. of the prepolymer obtained in Example 1 with 20 g. of wood flour and 500 g. of water was coated on the surfaces of two wood pieces having a water content of 40 %. The wood pieces were laid up and then pressed for 12 hours, whereby the two wood pieces were completely bonded.

On the other hand, the said composition was injected into cracks of a wood piece having a water content of 100 %, and the wood piece was allowed to stand for 3 hours, whereby the cracks were filled and bonded with a tough foam.

The thus obtained two woods could sufficiently withstand cutting with a rotary lathe, a slicer or a disc saw. The same effects as above could be obtained also in the case where the wood flour is replaced by organic fiber, wood chip or silica gel powder.

below was coated on the surfaces of two wood pieces having a water content of 90 %. The wood pieces were laid up and then pressurized for 12 hours, whereby the two wood pieces were completely bonded. The bonded wood could sufficiently withstand cutting with a rotary lathe, a slicer or a disc saw.

| Run No. | 1 | 2 | 3 | 4 | 5 | 6 | 7 | 8 | 9 | 10 |
|---|---|---|---|---|---|---|---|---|---|---|
| Wood flour (g) | 20 | 10 | 10 | 10 | — | — | — | — | — | — |
| Bark flour | — | 10 | — | — | 10 | — | — | — | — | — |
| Wheat flour | — | — | 15 | — | — | — | — | 25 | — | 15 |
| Soybean flour | — | — | — | 15 | — | — | — | — | 25 | 15 |
| Rice hull powder | — | — | — | — | 15 | — | — | — | — | — |
| Pulp powder | — | — | — | — | — | 20 | — | — | — | — |
| Linter powder | — | — | — | — | — | — | 20 | — | — | — |
| Shear strength (kg/cm$^2$) | 25 | 26 | 24 | 23 | 25 | 22 | 25 | 23 | 27 | 26 |

A liquid adhesive composition prepared by mixing each of the prepolymers obtained in Examples 2, 3, and 5 with the aforesaid amounts of wood flour and water was also used for the same bonding and filling as above to obtain the same results.

EXAMPLE 21

A liquid adhesive composition prepared by mixing 100 g. of the prepolymer obtained in Example 1 with a polyamide resin having an amine value of about 230 and 15 g. of wood flour was coated on the surfaces of two wood pieces having a water content of 85 %. The wood pieces were laid up and then pressurized, whereby the two wood pieces were completely bonded. The bonded wood could sufficiently withstand cutting with a rotary lathe, a slicer or a disc saw. The same effects as above could be obtained also in the case where the wood flour was replaced by organic fiber, wood chip or silica gel powder.

A liquid adhesive composition prepared by mixing each of the prepolymers obtained in Examples 2, 3, 4 and 5 with the aforesaid polyamide resin and wood flour was also used to bond the above-mentioned wood pieces to obtain the same results as above.

EXAMPLE 22

A liquid adhesive composition prepared by mixing 100 g. of the prepolymer obtained in Example 1 with 20 g. of MEK and 20 g. of wood flour was coated on the surfaces of two wood pieces having a water content of 90 %. The wood pieces were laid up and then pressurized for 12 hours, whereby the two wood pieces were completely bonded. The glue line of the bonded wood showed no change at all even when cut with a rotary lathe, a slicer or a disc saw. The same effects as above could be obtained also in the case where the wood flour was replaced by organic fiber, wood chip or silica gel powder.

A liquid adhesive composition prepared by mixing each of the prepolymers obtained in Examples 2, 3, 4 and 5 with the aforesaid MEK and wood flour was also used to bond the above-mentioned wood pieces to obtain the same results as above.

EXAMPLE 23

A liquid adhesive composition prepared by mixing 100 g. of the prepolymer obtained in Example 1 with any of such organic powders as shown in the table A liquid adhesive composition prepared by mixing each of the prepolymer obtained in Examples 2, 3, 4 and 5 with the aforesaid powder was also used to bond the abovementioned wood pieces to obtain the same results as above.

EXAMPLE 24

A liquid adhesive composition prepared by mixing 100 g. of the prepolymer obtained in Example 1 with 3 g. of titanium oxide was coated on the surfaces of two white oak wood pieces. The wood pieces were laid up and then pressurized for 12 hours, whereby the two wood pieces were completely bonded. The glue line of the bonded wood was identical in color with the wood, so that the existence of the glue line was not conspicuous.

On the other hand, the glue line of a bonded wood obtained in the same manner as above, except that the adhesive composition was applied to two walnut wood pieces having a water content of 70 %, was white and conspicuous, so that the bonded wood was interesting from the standpoint of design.

EXAMPLE 25

A liquid adhesive composition prepared by mixing 100 g. of the prepolymer obtained in Example 1 with 1 g. of a foam-controlling agent (Toray Silicone PUFA SH190; Toray Co.) was coated on the surfaces of two wood pieces having a water content of 90 %. The wood pieces were laid up and then pressurized for 12 hours, whereby the two wood pieces were completely bonded. The glue line of the bonded wood had been composed of fine and uniform foams.

If the prepolymer is mixed with water, then, it may foam particularly markedly. In such case, therefore, the use of foam-controlling agent is preferable so as to attain uniform adhesion.

EXAMPLE 26

The prepolymer obtained in Example 1 was injected into cracks of a starting wood for plywood which had been taken out of water. After 10 to 20 minutes, the cracks were completely filled with foams formed by the reaction of said prepolymer with water contained in the starting wood. After about 12 hours, the material wood was cut with a rotary lathe to obtain a continuous veneer having a thickness of 3 mm. This continuous veneer could easily be reeled and then dried with a continuous dryer, since the cracks thereof had completely been filled with the prepolymer foams. The thus dried veneer was cut to a required dimension, coated with a conventional adhesive for plywood, and then subjected to hot-pressing step to give a high quality plywood.

The above-mentioned operation was repeated, when the prepolymer was replaced by any of the prepolymers obtained in Examples 2, 3 and 5, and the adhesive compositions shown in Examples 6, 7, 8, 9 and 10, to obtain the same results as above.

EXAMPLE 27

The prepolymer obtained in Example 1 was coated on the end portions of three short logs having a water content of about 70 %, a diameter of 50 to 70 cm. and a length of 40 to 60 cm. which had flat cross-sections. The logs were laid up and then allowed to stand for 12 hours to prepare a regenerated log having a length of 150 cm. This log was cut with a rotary lathe to obtain veneers of 4 mm. in thickness. The glue lines of the thus obtained veneers were tough and did not peel even when the veneers were subjected to drying and adhesive coating steps.

The above operation was repeated, except that the prepolymer was replaced by any of the prepolymers obtain in Examples 2, 3 and 5 and the adhesive composition shown in Example 19, to obtain the same results as above.

EXAMPLE 28

The prepolymer obtained in Example 1 was coated on the sides of narrow flitches having a water content of 60 %. The flitches were laid up and then pressurized for 12 hours to obtain a regenerated flitch bonded to large size. The flitches could be bonded at any angle regardless of whether the grains thereof were parallel or perpendicular to each other. The thus obtained large-sized flitch was cut with a commercial face veneer slicer to obtain a largesized sliced veneer. The glue line of the sliced veneer was tough and was not broken in handling of the veneer.

The sliced veneer was bonded to the surface of plywood having a thickness of 6 mm. by use of a urea-formaldehyde resin-modified polyvinyl acetate resin adhesive to obtain an excellent sliced veneer-overlaid plywood.

The above operation was repeated, except that the prepolymer was replaced by any of the prepolymers prepared in Examples 2, 3 and 5 to obtain the same results as above.

EXAMPLE 29

Narrow wet veneers having a width of 5 to 80 cm., a thickness of 2.5 mm. and a water content of 70 to 80 % which had been obtained by cutting wet logs with a rotary lathe, were clipped with a clipper so as to match the edges thereof, and then the prepolymer obtained in Example 1 was coated on the edges of the veneers. Using the apparatus shown in FIG. 1, the veneers 3 were placed on the polyethylene sheet 1, wound around the drum 2, while lightly contacting the glue lines thereof with each other, and then allowed to stand for 12 hours. Subsequently, in the state that the veneers were still wound around the drum, the veneers were dried with dryer at 175°C. for 40 minutes to obtain a continuous veneer. The thus obtained continuous veneer had favorable spliced portions and did not differ in quality at all from the usual continuous veneer.

The above operation was repeated, except that the prepolymer was replaced by any of the prepolymers prepared in Examples 2, 3 and 5 and the adhesive compositions shown in Examples 6, 7, 8, 9 and 10, to obtain the same results as above.

EXAMPLE 30

Narrow wet veneers having a width of 5 to 80 cm., a thickness of 2.5 mm. and a water content of 70 to 80 %, which had been obtained by cutting wet logs with a rotary lathe, were clipped with a clipper to match the edges thereof, and then the prepolymer obtained in Example 1 was coated on the edge of the veneers. In the manner shown in FIG. 2, the veneers 3' were laid up between the pressurizing plates 4, while interposing the polyethylene sheets 1' between them, and then pressurized for 12 hours, whereby the veneers were strongly spliced with a foamed urethane resin to obtain a continuous veneer. The thus obtained veneer did not differ in quality at all from the usual continuous veneer.

The wet veneers could be spliced regardless of whether the edges thereof were parallel or perpendicular to the direction of grains.

Any of the prepolymers obtained in Examples 2, 3 and 5 and the adhesive compositions shown in Examples 6, 7, 8, 9 and 10 was also effective for splicing the above-mentioned wet veneers.

What is claimed is:

1. A plywood veneer comprising a plurality of veneer strips bonded to one another by glue lines, said strips being bonded with a water-cured adhesive composition consisting essentially of a hydrophilic, polyfunctional, liquid polyisocyanate prepolymer containing substantially no active hydrogen group and having an NCO group content of 2–15% by weight and a number average molecular weight of 1,000 to 20,000.

2. A plywood veneer in accordance with claim 1, wherein said adhesive is cured at room temperature by the presence of water in a log from which said strips are cut with a rotary lathe, the amount of water in said log being more than 25% by weight (dry base).

3. A plywood veneer in accordance with claim 1, wherein the required polyisocyanate prepolymer has the main chain consisting of a polyalkylene-ether-urethane chain and is water-soluble.

4. A plywood veneer in accordance with claim 1, wherein the required polyisocyanate prepolymer is an aliphatic polyisocyanate prepolymer.

5. A method for bonding wet woods, which comprises applying to wet woods a liquid adhesive composition comprising a hydrophilic, polyfunctional, liquid polyisocyanate prepolymer containing substantially no active hydrogen group and having an NCO group content of 2 to 15% by weight and a number average molecular weight of 1,000 to 20,000, and then subjecting the thus treated wet woods to bonding and curing at room temperature by the reaction of said adhesive composition with water in woods which is present in an amount of more than 25% by weight (dry base).

6. A method according to claim 5, wherein the liquid polyisocyanate prepolymer has the main chain consisting of a polyalkylene-ether-urethane chain and is water-soluble.

7. A method according to claim 5, wherein the liquid polyisocyanate prepolymer has the main chain consisting of a polyalkylene-ether-urethane chain and a polyester-urethane chain.

8. A method according to claim 5, wherein the liquid polyisocyanate prepolymer is an aliphatic polyisocyanate prepolymer.

9. A method for bonding wet woods, which comprises applying to wet woods a liquid adhesive composition comprising a hydrophilic, polyfunctional, liquid polyisocyanate prepolymer containing substantially no active hydrogen group and having an NCO group content of 2 to 15% by weight and a number average molecular weight of 1,000 to 20,000, and water as a crosslinking adjuvant, and then subjecting the thus treated wet woods to bonding and curing at room temperature by the reaction of said adhesive composition with water in woods which is present in an amount of more than 25% by weight (dry base).

10. A method according to claim 9, wherein the liquid polyisocyanate prepolymer has the main chain consisting of a polyalkylene-ether-urethane chain and is water-soluble.

11. A method according to claim 9, wherein the liquid polyisocyanate prepolymer has the main chain consisting of a polyalkylene-ether-urethane chain and a polyester-urethane chain.

12. A method according to claim 9, wherein the liquid polyisocyanate prepolymer is an aliphatic polyisocyanate prepolymer.

13. A method for bonding wet woods, which comprises applying to wet woods a liquid adhesive composition comprising a hydrophilic, polyfunctional, liquid polyisocyanate prepolymer containing substantially no active hydrogen group and having an NCO group content of 2 to 15% by weight and a number average molecular weight of 1,000 to 20,000 and an anhydrous solvent as viscosity regulator and defoaming agent, and then subjecting the thus treated wet woods to bonding and curing at room temperature by the reaction of said adhesive composition with water in woods which is present in an amount of more than 25% by weight (dry base).

14. A method according to claim 13, wherein the liquid polyisocyanate prepolymer has the main chain consisting of a polyalkylene-ether-urethane chain and is water-soluble.

15. A method according to claim 13, wherein the liquid polyisocyanate prepolymer has the main chain consisting of a polyalkylene-ether-urethane chain and a polyester-urethane chain.

16. A method for bonding wet woods, which comprises applying to wet woods a liquid adhesive composition consisting essentially of a hydrophilic, polyfunctional, liquid polyisocyanate prepolymer containing substantially no active hydrogen group and having an NCO group content of 2 to 15% by weight and a number average molecular weight of 1,000 to 20,000, water as a crosslinking adjuvant, and a hardener, and then subjecting the thus treated wet woods to bonding and curing at room temperature by the reaction of said adhesive composition with water in woods which in present in an amount of more than 25% by weight (dry base).

17. A method for bonding wet woods, which comprises applying to wet woods a liquid adhesive composition consisting essentially of a hydrophilic, polyfunctional, liquid polyisocyanate prepolymer containing substantially no active hydrogen group and having an NCO group content of 2 to 15% by weight and a number average molecular weight of 1,000 to 20,000, water as crosslinking adjuvant, a hardener, and an anhydrous solvent as viscosity regulator and defoaming agent, and then subjecting the thus treated wet woods to bonding and curing at room temperature by the reaction of said adhesive composition with water in woods which is present in an amount of more than 25% by weight (dry base).

18. A method for bonding wet woods, which comprises applying to wet woods a liquid adhesive composition consisting essentially of a hydrophilic, polyfunctional, liquid polyisocyanate prepolymer containing substantially no active hydrogen group and having an NCO group content of 2 to 15% by weight and a number average molecular weight of 1,000 to 20,000, and a filler as reinforcing agent and thixotroropy-imparting agent, and then subjecting the thus treated wet woods to bonding and curing at room temperature by the reaction of said adhesive composition with water in woods which is present in an amount of more than 25% by weight (dry base).

19. A method for bonding wet woods, which comprises applying to wet woods a liquid adhesive composition consisting essentially of a hydrophilic, polyfunctional, liquid polyisocyanate prepolymer containing substantially no active hydrogen group and having an NCO group content of 2 to 15% by weight and a number average molecular weight of 1,000 to 20,000, water as crosslinking adjuvant, and a filler as reinforcing agent and thixotropy-imparting agent, and then subjecting the thus treated wet woods to bonding and curing at room temperature by the reaction of said adhesive composition with water in woods which is present in an amount of more than 25% by weight (dry base).

20. A method for bonding wet woods, which comprises applying to wet woods a liquid adhesive composition consisting essentially of hydrophilic, polyfunctional, liquid polyisocyanate prepolymer containing substantially no active hydrogen group and having an NCO group content of 2 to 15% by weight and a number average molecular weight of 1,000 to 20,000, an anhydrous solvent as viscosity regulator and defoaming agent, and a filler as reinforcing agent and thixotropy-imparting agent, and then subjecting the thus treated wet woods to bonding and curing at room temperature by the reaction of said adhesive composition with water in woods which is present in an amount of more than 25% by weight (dry base).

21. A method according to claim 20, wherein the filler as reinforcing agent and thixotropy-imparting agent is at least one organic powder selected from the group consisting of wood flour, resin powder, grain powder, rice hull powder, pulp powder and linter powder.

22. A method for bonding wet woods, which comprises applying to wet woods a liquid adhesive composition consisting essentially of a hydrophilic, polyfunctional, liquid polyisocyanate prepolymer, containing substantially no active hydrogen group and having an NCO group content of 2 to 15% by weight and a number average molecular weight of 1,000 to 20,000, and a colorant, and then subjecting the thus treated woods to bonding and curing at room temperature by the reaction of said adhesive composition with water in woods which is present in an amount of 25% by weight (dry base).

23. A method for bonding wet woods, which comprises applying to wet woods a liquid adhesive composition consisting essentially of a hydrophilic, polyfunctional, liquid polyisocyanate prepolymer containing substantially no active hydrogen group and having an NCO group content of 2 to 15% by weight and a number average molecular weight of 1,000 to 20,000, and a foam-controlling agent, and then subjecting the thus treated wet woods to bonding and curing at room temperature by the reaction of said adhesive composition with water in woods which is present in an amount of 25% by weight (dry base).

24. A method for producing a wet veneer for plywood which is bonded edgewise to a desired width and has a glue line parallel to the fiber, which comprises filling cracks of a wet log with a liquid adhesive composition consisting essentially of a hydrophilic, polyfunctional, liquid polyisocyanate prepolymer containing substantially no active hydrogen group and having an NCO group content of 2 to 15% by weight and a number average molecular weight of 1,000 to 20,000, curing the said adhesive composition at room temperature by the reaction with water in said log which is present in an amount of more than 25% by weight (dry base), and then cutting the resulting log with a rotary lathe.

25. A method for producing a wet veneer for plywood which is bonded edgewise to a desired width and has a glue line perpendicular to the fiber direction, which comprises applying to the end surfaces of wet short logs a liquid adhesive composition consisting essentially of a hydrophilic, polyfunctional, liquid polyisocyanate prepolymer containing substantially no active hydrogen group and having an NCO group content of 2 to 15% by weight and a number average molecular weight of 1,000 to 20,000, putting the thus treated surfaces of wet short logs in contact with one another, curing said adhesive composition at room temperature by the reaction with water in said logs which is present in an amount of more than 25% by weight (dry base), and then cutting the resulting log with a rotary lathe.

26. A method for producing a wet decorative sliced veneer which is bonded edgewise to a desired width, which comprises applying to wet flitches a liquid adhesive composition consisting essentially of a hydrophilic, polyfunctional, liquid polyisocyanate prepolymer containing substantially no active hydrogen group and having an NCO group content of 2 to 15% by weight and a number average molecular weight of 1,000 to 20,000, putting the thus treated flitches in contact with one another, curing said adhesive composition at room temperature by the reaction with water in said flitches which is present in an amount of more than 25% by weight (dry base), and then slicing the resulting bonded wet flitches.

27. A method for producing a wet veneer for plywood which is bonded edgewise to a desired width, which comprises splicing narrow wet veneers with a liquid adhesive composition consisting essentially of a hydrophilic, polyfunctional, liquid polyisocyanate prepolymer containing substantially no active hydrogen group and having an NCO group content of 2 to 15% by weight and a number average molecular weight of 1,000 to 20,000, and then curing said adhesive composition at room temperature by the reaction with water in said veneers which is present in an amount of more than 25% by weight (dry base).

28. A method according to claim 27, wherein the narrow veneers are spliced in parallel to the fiber direction.

29. A method according to claim 27, wherein the narrow veneers are spliced perpendicularly to the fiber direction.

30. A method according to claim 25, wherein the liquid polyisocyanate prepolymer has the main chain consisting of a polyalkylene-ether-urethane chain and is water-soluble.

31. A method according to claim 26, wherein the liquid polyisocyanate prepolymer has the main chain consisting of a polyalkylene-ether-urethane chain and is water-soluble.

32. A method according to claim 26, wherein the liquid polyisocyanate prepolymer has the main chain consisting of a polyalkylene-ether-urethane chain and a polyester-urethane chain.

33. A method according to claim 26, wherein the liquid polyisocyanate prepolymer is an aliphatic polyisocyanate prepolymer.

34. A method for producing a wet veneer for plywood which is bonded edgewise to a desired width and has a glue line parallel to the fiber direction, which comprises filling cracks of a wet log with a liquid adhesive composition consisting essentially of a hydrophilic, polyfunctional, liquid polyisocyanate prepolymer containing substantially no active hydrogen group and having an NCO group content of 2 to 15% by weight and a number average molecular weight of 1,000 to 20,000, and water as crosslinking adjuvant, curing said adhesive composition at room temperature by the reaction with water in said log which is present in an amount of more than 25% by weight (dry base), and then cutting the resulting log with a rotary lathe.

35. A method for producing a wet veneer for plywood which is bonded edgewise to a desired width, which comprises splicing narrow wet veneers with a liquid adhesive composition consisting essentially of a hydrophilic, polyfunctional liquid polyisocyanate prepolymer containing substantially no active hydrogen group and having an NCO group content of 2 to 15% by weight and a number average molecular weight of 1,000 to 20,000, and water as crosslinking adjuvant, and then curing said adhesive composition at room temperature by the reaction with water in said veneers which is present in an amount of more than 25% by weight (dry base).

36. A method for producing a wet veneer for plywood which is bonded edgewise to a desired width and has a glue line perpendicular to the fiber direction, which comprises applying to the end surfaces of wet short logs a liquid adhesive composition consisting essentially of a hydrophilic, polyfunctional, liquid polyisocyanate prepolymer containing substantially no active hydrogen group and having an NCO group content of 1,000 to 20,000, and water as crosslinking adjuvant, putting the thus treated surfaces of wet short logs in contact with one another, curing said adhesive composition at room temperature by the reaction with water in said logs which is present in an amount of more than 25% by weight (dry base), and then cutting the resulting log with a rotary lathe.

* * * * *